United States Patent
Choudhary et al.

(10) Patent No.: US 12,260,085 B2
(45) Date of Patent: Mar. 25, 2025

(54) DYNAMICALLY DETERMINING A MEMORY BLOCK THRESHOLD FOR INITIATING A GARBAGE COLLECTION PROCESS

(71) Applicant: Sandisk Technologies, Inc., Milpitas, CA (US)

(72) Inventors: Anamika Choudhary, Bangalore (IN); Disha Sharma, Bangalore (IN)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/361,093

(22) Filed: Jul. 28, 2023

(65) Prior Publication Data

US 2024/0419326 A1   Dec. 19, 2024

Related U.S. Application Data

(60) Provisional application No. 63/508,799, filed on Jun. 16, 2023.

(51) Int. Cl.
*G06F 3/06* (2006.01)
*G06F 12/02* (2006.01)

(52) U.S. Cl.
CPC ............ *G06F 3/0608* (2013.01); *G06F 3/064* (2013.01); *G06F 3/0652* (2013.01); *G06F 3/0659* (2013.01); *G06F 3/0679* (2013.01); *G06F 12/0246* (2013.01)

(58) Field of Classification Search
None
See application file for complete search history.

(56) References Cited

U.S. PATENT DOCUMENTS

| | | | |
|---|---|---|---|
| 11,556,258 B1* | 1/2023 | Huang | G06F 3/0635 |
| 11,599,298 B1* | 3/2023 | B N | G06F 3/064 |
| 11,768,617 B2* | 9/2023 | Kim | G06F 3/0616 |
| | | | 711/154 |
| 2012/0159051 A1* | 6/2012 | Hida | G06F 12/0246 |
| | | | 711/E12.008 |
| 2014/0181370 A1* | 6/2014 | Cohen | G06F 12/0246 |
| | | | 711/103 |
| 2020/0104254 A1* | 4/2020 | Lee | G06F 12/0253 |
| 2022/0398029 A1* | 12/2022 | A | G06F 3/0604 |

* cited by examiner

*Primary Examiner* — Kaushikkumar M Patel
(74) *Attorney, Agent, or Firm* — DENTONS Durham Jones Pinegar

(57) ABSTRACT

A write pattern of a host device is used to dynamically determine when to initiate a garbage collection process on a data storage device. The write pattern of the host device is based on a number of I/O commands received from the host device and on a number of available memory blocks in the data storage device. If the write pattern of the host device indicates that fewer than a threshold number of memory blocks will be available after a predetermined number of additional I/O commands are received, the garbage collection process is initiated. An amount of valid data that is transferred from one memory location to another memory location during the garbage collection process is also dynamically determined. Thus, a garbage collection process may be tailored to a specific host device.

20 Claims, 6 Drawing Sheets

200

| 210 I/O COMMANDS (X) | 256 | | | | | ••• | |
|---|---|---|---|---|---|---|---|
| 220 FREE BLOCKS (Y) | 790 | | | | | | |

200

| 210 I/O COMMANDS (X) | 256 | 512 | 768 | 1024 | 1280 | ••• | 2304 |
|---|---|---|---|---|---|---|---|
| 220 FREE BLOCKS (Y) | 790 | 785 | 779 | 774 | 769 | | 734 |

| AVERAGE VFC | DATA TO RELOCATE |
|---|---|
| > 75% | 1 WORDLINE OF DATA |
| 50% - 75% | ½ WORDLINE OF DATA |
| 25% - 50% | ⅓ WORDLINE OF DATA |
| 0% - 25% | ¼ WORDLINE OF DATA |

DYNAMICALLY DETERMINING A MEMORY BLOCK THRESHOLD FOR INITIATING A GARBAGE COLLECTION PROCESS

CROSS-REFERENCE TO RELATED APPLICATIONS

The present application claims priority to U.S. Provisional Application 63/508,799 entitled "DYNAMICALLY DETERMINING A MEMORY BLOCK THRESHOLD FOR INITIATING A GARBAGE COLLECTION PROCESS", filed Jun. 16, 2023, the entire disclosure of which is hereby incorporated by reference in its entirety.

BACKGROUND

Non-volatile storage devices, such as NAND flash memory devices, are used in a variety of electronic devices. Examples include solid-state-drives (SSDs), smartphones, tablets, memory cards, USB flash drives and the like. To achieve sustained performance over the lifetime of the non-volatile storage device, various operations, such as garbage collection operations, need to be periodically performed. During garbage collection operations, valid data from a memory block that is to be erased is transferred to a new memory block. Once the data has been transferred, the old memory block may be erased.

In some data storage devices, garbage collection operations are not initiated until a number of free memory blocks in the data storage device reaches or falls below a static threshold. However, waiting to initiate garbage collection operations until the threshold is reached can cause performance issues. For example, as the number of free memory blocks is reduced, the ability of the data storage device to store new data is also reduced. As a result, newly received write operations may not be completed until garbage collection operations have been initiated and/or completed. In another example, the garbage collection operations may consume most, or all, of the time that is allocated for various other background operations that need to be performed when a command is received from a host device. This may also negatively impact the performance of the data storage device.

Accordingly, it would be beneficial for a data storage device to dynamically determine when to initiate garbage collection operations without waiting for a number of free memory blocks to fall below a static threshold.

SUMMARY

The present application describes dynamically determining when to initiate a garbage collection process for a data storage device. In an example, the determination is based, at least in part, on a number of free memory blocks in the data storage device and on a pattern in which a host device writes data (referred to herein as a write pattern) to the data storage device.

For example, a controller or firmware of the data storage device may determine the write pattern of the host device by tracking or monitoring a number of input/output (I/O) commands received from the host device and/or resolved by the data storage device. After a threshold number of I/O commands are received, the controller or the firmware determines a number (or an amount) of memory blocks that are free or available in the data storage device. The number of I/O commands and the number of free memory blocks are stored as a data point for a linear regression model.

When a threshold number of data points are received, the linear regression model uses the data points to determine the write pattern of the host device. If the write pattern of the host device indicates that fewer than a threshold number of memory blocks will be available after a certain number of additional I/O commands are received, the garbage collection process is initiated.

In addition to dynamically determining (e.g., based on the write pattern of the host device) whether to initiate the garbage collection process, an amount of valid data that is relocated or transferred from one memory location to another memory location in the data storage device is also dynamically determined. In an example, the amount of data that is transferred or relocated is based, at least in part, on an average valid fragment count (VFC) of the data storage device.

For example, if the VFC is above a first threshold, a first amount of data is relocated each time an I/O command is received from the host device and/or executed. However, if the VFC is above a second threshold but below the first threshold, a second amount of data is relocated each time an I/O command is received from the host device and/or executed.

Accordingly, one example of the present application describes a method for dynamically determining whether to initiate a garbage collection process. In an example, the method includes tracking a number of commands received from a host device. A number of free memory blocks in a data storage device is determined based, at least in part, on a predetermined number of commands being received. A write pattern of the host device is determined based, at least in part, on the number of commands received from the host device and on the number of free memory blocks in the data storage device. A garbage collection process may be initiated based, at least in part, on the determined write pattern of the host device.

A data storage device is also described. In an example, the data storage device includes a controller and one or more memory devices. The one or more memory devices are communicatively coupled to the controller and store instructions. When the controller executes the instructions, the controller tracks a number of commands received from a host device. The controller may also determine a number of free memory blocks in the data storage device. In an example, the number of free memory blocks in the data storage device is determined when a predetermined number of commands have been received from the host device. The number of commands received from the host device and the determined number of free memory blocks are stored as a data point. The controller also determines a write pattern of the host device based, at least in part, on a number of data points exceeding a data point threshold. The controller may also initiate a garbage collection process based, at least in part, on the determined write pattern of the host device.

In another example, a data storage device includes means for tracking a number of commands received from a host device. The data storage device may also include means for determining a number of free memory blocks in the data storage device when a predetermined number of commands have been received. The data storage device also includes means for determining a write pattern of the host device. In an example, the write pattern of the host device is based, at least in part, on the number of commands received from the host device and the number of free memory blocks in the data storage device. The data storage device also includes means for initiating a garbage collection process based, at least in part, on the determined write pattern of the host device.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
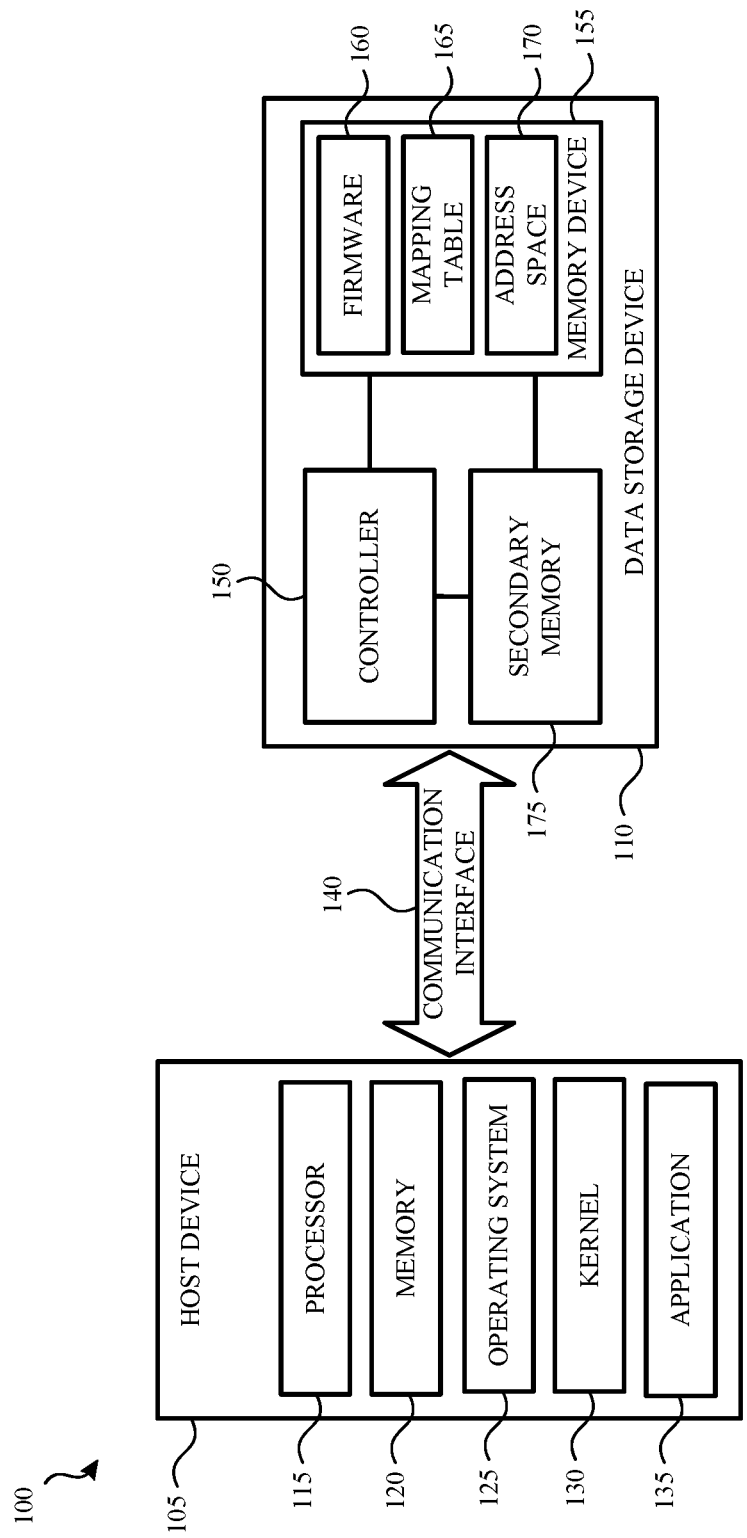
FIG. 1 is a block diagram of a system that includes a host device and a data storage device according to an example.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. The following detailed description is therefore not to be taken in a limiting sense, and the scope of the present disclosure is defined by the appended claims and their equivalents.

Various non-volatile storage devices (e.g., NAND flash memory devices) are used in a variety of electronic devices. For example, non-volatile storage devices may be included in solid-state-drives (SSDs), smartphones, tablets, memory cards, USB flash drives and the like. As previously indicated, in order to achieve sustained performance over the lifetime of the non-volatile storage device, various operations, such as garbage collection operations, need to be periodically performed. During garbage collection, memory blocks having invalid pages are identified. Valid data from the identified memory blocks are copied to new, empty memory blocks. Once the valid data has been moved, the old memory blocks are erased and made available for use.

In some data storage devices, garbage collection operations are not initiated until a number of free memory blocks in the data storage device reaches or falls below a threshold. However, waiting to initiate garbage collection operations can cause performance issues. For example, as the number of free memory blocks is reduced, the ability for the data storage device to store new data is also reduced. In another example, the garbage collection operations may consume most or all of the time allocated for various other background operations. This may also negatively impact the performance of the data storage device.

In order to address the above, the present application describes dynamically determining whether and/or when to initiate a garbage collection process. In an example, the determination is based, at least in part, on a determined write pattern of a host device that is associated with the data storage device. As will be described in greater detail herein, the write pattern of the host device is based, at least in part, on a number of input/output (I/O) commands received from a host device and on the number of free memory blocks in the data storage device once a threshold number of I/O commands have been received and/or executed. The number of I/O commands and the number of free memory blocks that are available are stored as a data point for a linear regression model.

After a threshold number of data points are received, the linear regression model uses the data points to determine the write pattern of the host device. If the write pattern of the host device indicates that fewer than a threshold number of memory blocks will be available after a certain number of additional I/O commands are received, the garbage collection process is initiated.

In addition to dynamically determining whether to initiate the garbage collection process, an amount of valid data that is transferred or relocated from one memory location to another memory location in the data storage device is also dynamically determined. In an example, the amount of data that is transferred is based, at least in part, on an average valid fragment count (VFC) of the data storage device.

For example, if the average VFC of the data storage device is above a first threshold, a first amount of data is relocated each time an I/O command is received from the host device. However, if the average VFC is above a second threshold but below the first threshold, a second amount of data is relocated each time an I/O command is received from the host device.

Accordingly, many technical benefits may be realized including, but not limited to, increasing the performance of non-volatile storage devices by reducing or eliminating bottlenecks that may be caused by various garbage collection operations, enabling garbage collection operations to be tailored to a host device based on write patterns associated with the host device, and providing a way for non-volatile storage devices to perform garbage collection operations without negatively impacting performance of the non-volatile storage device and without unduly consuming resources of the host device.

These and other examples will be shown and described in greater detail with respect to FIG. 1-FIG. 9.

FIG. 1 is a block diagram of a system 100 that includes a host device 105 and a data storage device 110 according to an example. In an example, the host device 105 includes a processor 115 and a memory 120 (e.g., main memory). The memory 120 may store, include or otherwise be associated with an operating system 125, a kernel 130 and/or an application 135.

The processor 115 can execute various instructions, such as, for example, instructions from the operating system 125 and/or the application 135. The processor 115 may include circuitry such as a microcontroller, a Digital Signal Processor (DSP), an Application-Specific Integrated Circuit (ASIC), a Field Programmable Gate Array (FPGA), hard-wired logic, analog circuitry and/or various combinations thereof. In an example, the processor 115 may include a System on a Chip (SoC).

In an example, the memory 120 can be used by the host device 105 to store data used by the processor 115. Data stored in the memory 120 may include instructions provided by the data storage device 110 via a communication interface 140. The data stored in the memory 120 may also include data used to execute instructions from the operating system 125 and/or one or more applications 135. In an example, the memory 120 is volatile memory, such as, for example, Dynamic Random Access Memory (DRAM).

The operating system 125 may create a virtual address space for the application 135 and/or other processes executed by the processor 115. The virtual address space may map to locations in the memory 120. The operating system 125 may include or otherwise be associated with a kernel 130. The kernel 130 may include instructions for managing various resources of the host device 105 (e.g., memory allocation), handling read and write requests and so on.

The communication interface 140 communicatively couples the host device 105 and the data storage device 110. The communication interface 140 may be a Serial Advanced Technology Attachment (SATA), a PCI express (PCIe) bus, a Small Computer System Interface (SCSI), a Serial Attached SCSI (SAS), Ethernet, Fibre Channel, or WiFi.

As such, the host device 105 and the data storage device 110 need not be physically co-located and may communicate over a network such as a Local Area Network (LAN) or a Wide Area Network (WAN), such as the internet. In addition, the host device 105 may interface with the data storage device 110 using a logical interface specification such as Non-Volatile Memory express (NVMe), Universal Flash Storage (UFS) or Advanced Host Controller Interface (AHCI).

The data storage device 110 may include a controller 150 and a memory device 155 (e.g. volatile and/or non-volatile memory). The memory device 155 (and/or portions of the memory device 155) may also be referred to as a storage medium. The memory device 155 may include a number of storage elements. In an example, each storage element is a chip or a memory die that is used to store data.

For example, the memory device 155 may include a first memory die and a second memory die. In an example, the first memory die and the second memory die include non-volatile memory elements such as, for example, NAND flash memory elements and/or NOR flash memory elements. Although two memory dies are mentioned, the memory device 155 may include any number of storage elements. For example, the storage elements may take the form of solid-state memory such as, for example, 2D NAND, 3D NAND memory, multi-level cell memory, triple level cell memory, quad-level cell memory, penta-level cell memory or any combination thereof.

The controller 150 may include circuitry for executing instructions. The instructions may originate from firmware 160 associated with the data storage device 110. In another example, the instructions may originate from the host device 105. Accordingly, the controller 150 may include circuitry such as one or more processors, a microcontroller, a DSP, an ASIC, an FPGA, hard-wired logic, analog circuitry and/or a combination thereof. In another example, the controller 150 may include a SoC.

In an example, the controller 150 and/or the firmware 160 may initiate or otherwise control a garbage collection process that is performed on the memory device 155. As will be explained in more detail, initiation of the garbage collection process may be based, at least in part, on a dynamically determined number or amount of free memory blocks and on a determined write pattern of the host device 105.

The data storage device 110 may also include secondary memory 175. The secondary memory 175 may be a rotating magnetic disk, a non-volatile solid-state memory (e.g., a flash memory) or other memory device. While the description herein refers to solid-state memory generally, it is understood that solid-state memory may comprise one or more of various types of memory devices such as flash integrated circuits, NAND memory (e.g., single-level cell (SLC) memory, multi-level cell (MLC) memory (i.e., two or more levels), or any combination thereof), NOR memory, EEPROM, other discrete Non-Volatile Memory (NVM) chips, or any combination thereof.

In some examples, the memory device 155 is capable of storing data at a byte-addressable level, as opposed to other types of non-volatile memory that have a smallest writable data size such as a page size of 4 KB or a sector size of 512 Bytes.

In some examples, the memory device 155 may also store a mapping table 165 and/or an address space 170. In some examples, the controller 150 can associate portions of data stored in the secondary memory 175 with unique identifiers. The unique identifiers may be stored in the memory device 155 and be used by the operating system 125 to access stored data. For example, the mapping table 165 can provide a mapping of unique identifiers with indications of physical locations (e.g., Physical Block Addresses (PBAs)) where the corresponding portions of data are stored in the memory device 155 and/or the secondary memory 175.

The memory device 155 may also include address space 170. The address space 170 can serve as at least a portion of an address space used by the processor 115. In an example, the address space 170 can store data at a byte-addressable level that can be accessed by the processor 115 (e.g., via the communication interface 140).

For example, the data storage device 110 may provide the host device 105 with an indication of the address space 170. The host device 105 may then associate an address range for the address space 170 and an indication that this address range is to be used as a byte-addressable address space, such as for a page cache.

In another example, the host device 105 may manage the data storage device 110 such that the processor 115 can directly access address space 170. For example, the data storage device 110 may provide logical to physical address translation information to the host device 105, which can be called by the host device 105 and executed by the processor 115 and/or the controller 150. In some examples, the controller 150 may include or otherwise be associated with a flash translation layer (FTL). The FTL may map the logical block addresses to the physical locations or PBA of the memory device 155.

Although FIG. 1 illustrates the host device 105 being separate from the data storage device 110, the host device 105 and the data storage device 110, as well the various components described, may be part of a single device or part of multiple devices. In another example, the data storage device 110 may be a removable storage device such as a USB Flash Memory Drive, a microSD card and the like.

In an example the controller 150 may initiate and/or a control garbage collection process or garbage collection operations. Garbage collection operations are used to reclaim previously written memory blocks in the memory device 155 so the memory blocks, and its associated pages, may be rewritten with new data.

Typically, a garbage collection process involves multiple operations. For example, the controller 150 and/or the firmware 160 may identify and/or mark memory blocks of the memory device 155 that contain invalid data or that are partially filled. The controller 150 and/or the firmware 160 may move, transfer or relocate valid data from the identified or marked memory blocks to new memory blocks. The old memory blocks are subsequently erased and may be used in the future.

In addition to initiating and/or controlling the garbage collection process, the controller 150 and/or the firmware 160 may also dynamically determine when to initiate the garbage collection process. In an example, the determination as to whether and/or when to initiate the garbage collection process is based, at least in part, on a determined write pattern of the host device 105. In an example, one host device may have a different write pattern from another host device. Accordingly, the present application enables garbage collection operations to be tailored to various host devices.

In an example, the write pattern of the host device 105 is a pattern by which data from the host device 105 is written or otherwise stored in the memory device 155 of the data storage device 110. When the write pattern of the host device 105 is determined, the controller 150 and/or the firmware 160 may predict or determine when a number of free memory blocks will fall below a free memory block threshold and initiate garbage collection operations accordingly.

In an example, the write pattern of the host device 105 is determined by tracking or monitoring the number of input/output (I/O) commands issued by the host device 105. When a threshold number of I/O commands are received, the controller 150 (and/or the firmware 160) determines a number of free memory blocks (or available memory blocks) in the memory device 155. The number of I/O commands that are received and the amount of free memory blocks are associated with each other and stored as a data point. The data point will subsequently be used by a linear regression model to determine the write pattern of the host device 105.

For example, the controller 150 and/or the firmware 160 may determine the amount or number of free blocks in the memory device 155 each time 256 I/O commands are received from the host device 105 and/or are executed. Although 256 I/O commands are specifically mentioned, the number of free blocks in the memory device 155 may be determined after n I/O commands are received/executed.

In an example, the variable n may be predetermined. In another example, the variable n may be based on one or more factors including, but not limited to, the type of host device 105 that is providing the I/O commands, the type of data being written to the data storage device 155, a type of the data storage device 110, a storage size of the data storage device 110, and so on.

In an example, each time the threshold number of I/O commands is received, the number of free memory blocks is determined and a new data point is created. Each data point may be stored in the data storage device 110.

Figures 2A, 2B, 3:
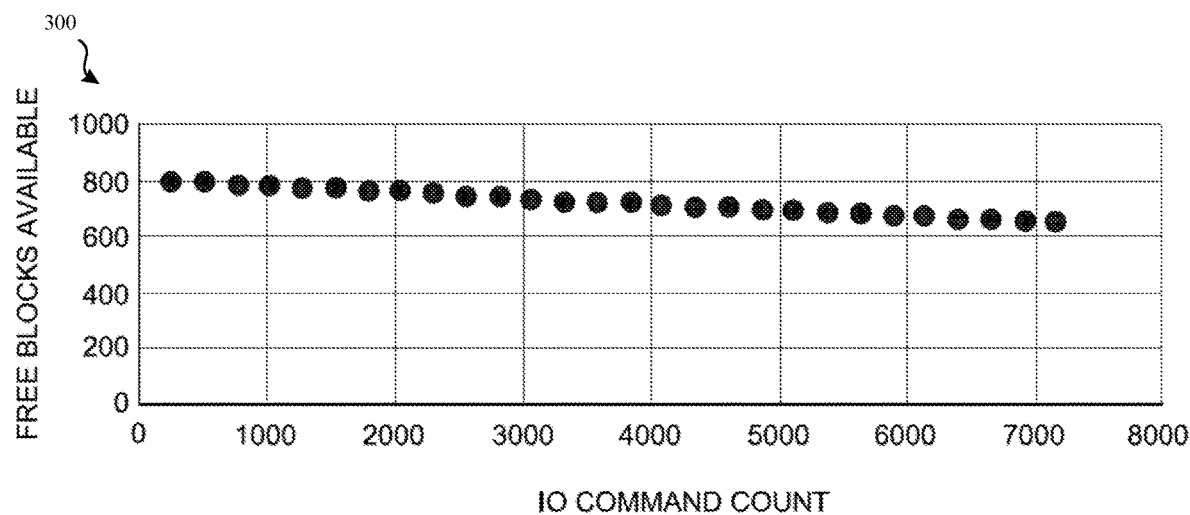
FIG. 2A-FIG. 2B illustrate how data points that represent a number of received I/O commands and a number of free memory blocks are stored by a data storage device according to an example.
FIG. 3 illustrates an example scatter plot that includes the data points of FIG. 2A-FIG. 2B according to an example.

For example and referring to FIG. 2A, a data structure 200 may store the number of I/O commands 210 that have been received from a host device and the number of free memory blocks 220 in a data storage device. As previously indicated, in this example, the number of I/O commands 210 that have been received is 256. Thus, a value of 256 is stored in the I/O commands field 210. When 256 I/O commands 210 have been received, the firmware 160 and/or the controller 150 may determine that the number of free memory blocks 220 is 790.

This process may repeat until a threshold number of data points have been determined and/or stored. In one example, the threshold number of data points is predetermined. In another example, the threshold number of data points is based on one or more factors including, but not limited to, a type of data being written to the data storage device, a size/capacity of the data storage device, a type of the data storage device, a type of the host device and so on.

In this example, the above-described process is repeated each time 256 I/O commands 210 are received. For example and referring to FIG. 2B, the data structure 200 shows that when 512 I/O commands 210 have been received, there are 785 free memory blocks 220 in the data storage device 110. Likewise, when 768 I/O commands 210 have been received, there are 779 free memory blocks 220. For visual reference, the data in the data structure 200 may also be represented in a scatter plot 300 shown in FIG. 3.

Referring back to FIG. 1, when a threshold number of data points have been received, the controller 150 and/or the firmware 160 may predict or determine the number of memory blocks that will be used in upcoming or future I/O commands that will be received from the host device 110 and/or executed/resolved. The upcoming commands may be the next n I/O commands (e.g., the next 256 I/O commands) or the next n*m I/O commands (where m indicates a number of times that n I/O commands will be received). In another example, the controller 150 and/or the firmware 160 may predict or determine the number of memory blocks that will be available after the next n*m I/O commands are received and/or resolved/executed.

In an example, the controller 150 and/or the firmware 160 make the determination or the prediction using linear regression (or a linear regression model). For example, the controller 150 and/or the firmware 160 may generate and/or use a statistical model that indicates a linear relationship between a dependent variable "Y" (e.g., the amount of free blocks available in the data storage device 110) and an independent variable "X" (e.g., the number of I/O commands that are received/resolved). The linear relationship may be used to predict or determine the write pattern of the host device (e.g., how the host device 105 will act when issuing future I/O commands to the data storage device 110).

In an example, the linear regression line corresponding to the data points shown in FIG. 2A-FIG. 2B, (and partially represented in the scatter plot 300 (FIG. 3)) may be represented as:

$$y = ax + b,$$

where $$a = \frac{SP}{SS_x},$$

b=mean (y)−a (mean (x)), SS=sum of squares, and SP=sum of products.

Using the above equation and the data in the data structure 200, the value of a is −0.0218 and the value of b is 796.6. Accordingly, the linear regression line may be represented as y=−0.0218x+796.6. For visual purposes, the generated linear regression line is shown as a linear regression line 400 in FIG. 4.

In this example, the value of x may correspond to a total number of I/O commands at which a number of free memory blocks may reach a particular free memory block threshold. In an example, the free memory block threshold is predetermined. In another example, the free memory block threshold may be based on the various factors including, but not limited to, a type of data being written to the data storage device, a size/capacity of the data storage device, a type of the data storage device, a type of the host device and so on.

In an example, the linear regression line 400 may be used to determine whether the amount of free memory blocks will fall below a free memory block threshold after n*m I/O commands are received and/or resolved. For example, if the variable m is 20 and the variable n is 256, a determination is made as to whether the number of free memory blocks will be at or below the free memory block threshold (e.g., 10 free memory blocks) after a total of 5,120 I/O commands are received/resolved.

If it is determined (based on the linear regression model) that the number of free memory blocks will be at or below the free memory block threshold value after an additional 5,120 I/O commands are received/resolved, a garbage collection process may be initiated. However, if it is determined that the number of free memory blocks will not be at or below the free memory block threshold, the garbage collection process may not be initiated. In an example, the equation described above may be recalculated each time n number (e.g., 256) of I/O commands are received/resolved.

Referring back to FIG. 1, in addition to dynamically determining whether to initiate the garbage collection process, the controller 150 and/or the firmware 160 may also determine an amount of valid data that is to be relocated from one memory location in the memory device 155 to another memory location in the memory device 155. In an example, the amount of valid data to be relocated is also dynamically determined. Additionally, in an example, the garbage collection process may relocate the determined amount of data each time another I/O command is received from the host device 105 and/or resolved.

In an example, the amount of data that is relocated is based, at least in part, on an average valid fragment count (VFC) of the memory device 155. In an example, the average VFC indicates how many valid segments (e.g., pages or metapages) of a particular size (e.g., four kilobytes (KBs)) are in each memory block (e.g., a metablock) across the entire data storage device 110. In an example, the average VFC may be stored, tracked and/or determined by the controller 150 and/or the firmware 160. In another example, the average VFC may be stored in an Inverse Group Address Table (IGAT).

In an example, if the average VFC is above a first threshold, a first amount of data is relocated each time an I/O command is received from the host device 105 and/or resolved. In another example, if the average VFC is above a second threshold but below the first threshold, a second amount of data is relocated each time an I/O command is received from the host device 105 and/or resolved.

Figures 4, 5:
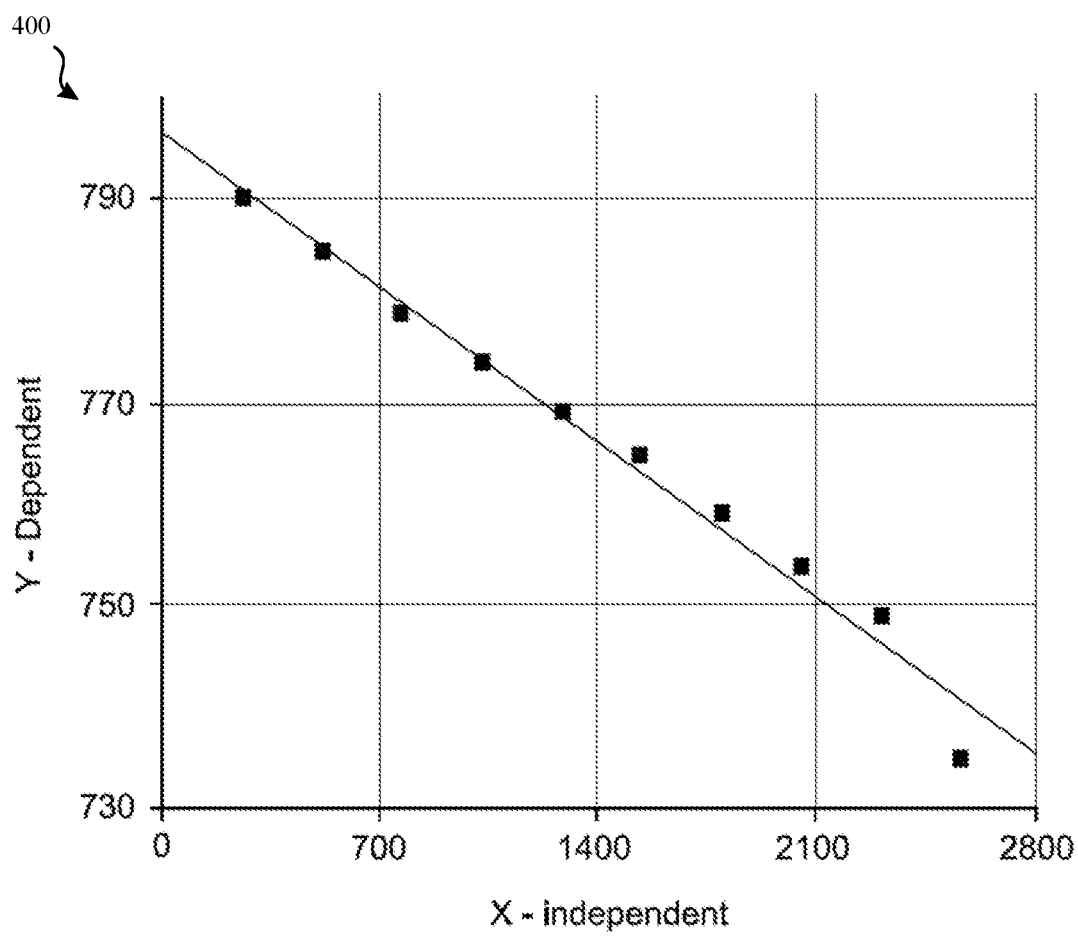
FIG. 4 illustrates a linear regression line that is determined using a linear regression model and is based on data points shown and described with respect to FIG. 2A-FIG. 2B according to an example.
FIG. 5 is a table that illustrates an amount of data to relocate during a garbage collection process based on a determined average valid fragment count (VFC) of the data storage device.

For example and referring to FIG. 5, FIG. 5 is a table 500 that illustrates an amount of data to relocate 520 during a garbage collection process based on a determined average valid fragment count (VFC) 510 of the data storage device. In this example, if the average VFC 510 is greater than 75%, one wordline worth of data is relocated from a first memory location in a memory device of the data storage device to a second memory location in the memory device (e.g., each time an I/O command is received/resolved). However, if the average VFC 510 is between 50% and 75%, ½ wordline worth of data is relocated from a first memory location to a second memory location in the memory device (e.g., each time an I/O command is received/resolved). In another example, if the average VFC 510 is between 25% and 50%, ⅓ wordline worth of data is relocated from a first memory location to a second memory location and if the average VFC 510 is between 0% and 25%, ¼ wordline worth of data is relocated from a first memory location to a second memory location. Although specific ranges are given, other ranges may be used.

Figure 6:
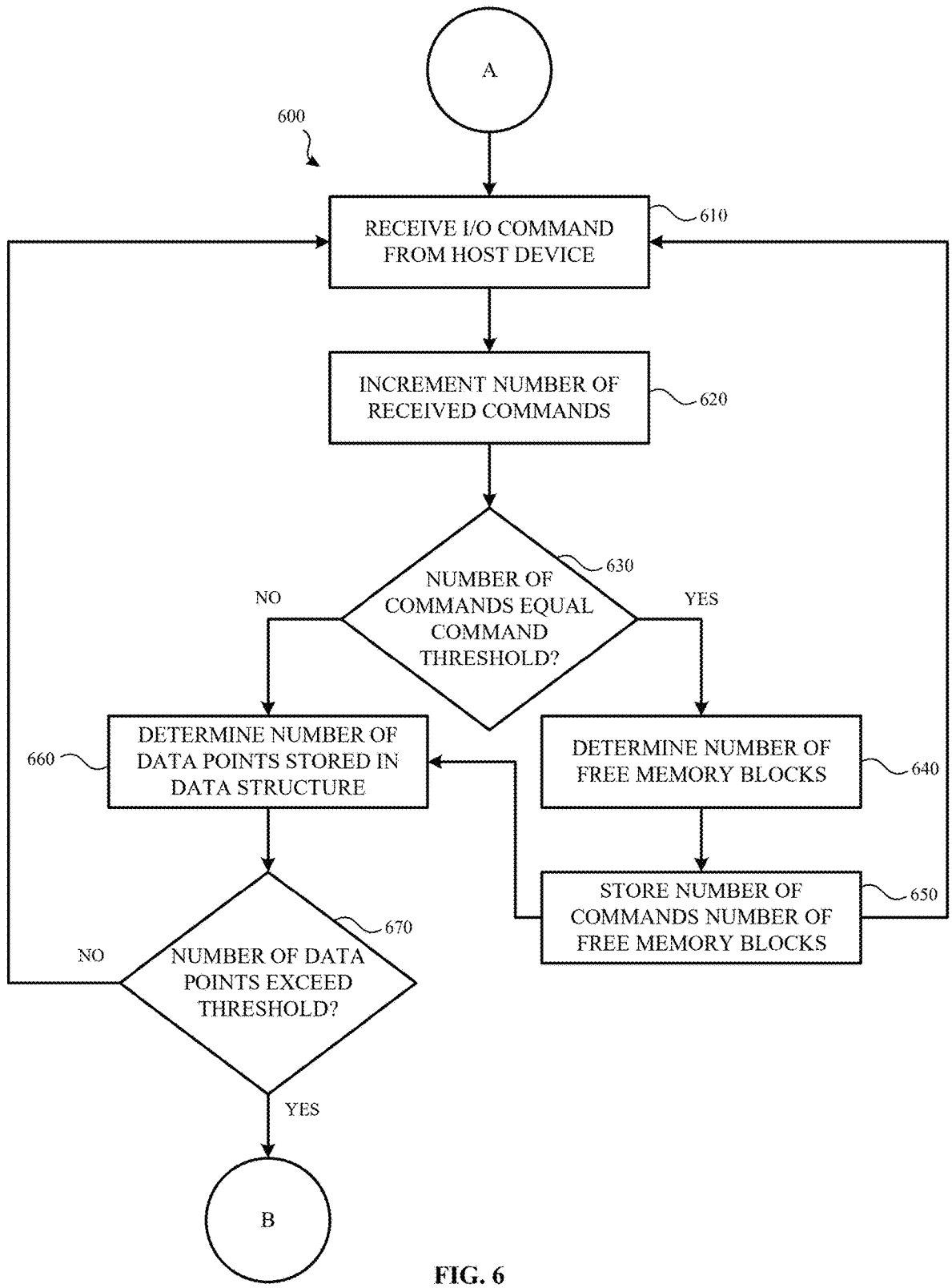
FIG. 6 illustrates a method for tracking a number of commands received from a host device according to an example.

FIG. 6 illustrates a method 600 for tracking a number of commands received from a host device according to an example. In an example, the method 600 may be performed by a controller and/or firmware of a data storage device, such as, for example, the controller 150 and/or the firmware 160 of the data storage device 110 shown and described with respect to FIG. 1. Additionally, the method 600 may be used in conjunction with a method 700 shown and described with respect to FIG. 7 to determine a write pattern of a host device (e.g., host device 105 (FIG. 1)).

In an example, the method 600 begins when an I/O command is received (610) from a host device. When the I/O command is received from the host device (and/or when the received command is resolved), a number of received I/O commands is incremented (620). In an example, the number of commands may be stored in a data structure of the data storage device.

The controller and/or the firmware may then determine (630) whether the number of received I/O commands is equal to (or exceeds) a received I/O command threshold. As indicated in previous examples, the command threshold may be 256, although other thresholds may be used.

If it is determined (630) that the number of received I/O commands is equal to (or exceeds) the received I/O command threshold, the controller and/or the firmware may determine (640) the number of free memory blocks in the data storage device. The number of received I/O commands and the number of free memory blocks in the data storage device are associated and stored (650) as a data point (e.g., in a data structure). The method 600 may then be repeated.

In another example, when the number of received I/O commands and the number of free memory blocks in the data storage device are stored (650) as a data point, the controller and/or the firmware may determine (660) a number of data points that have been stored. A determination is then made as to whether (670) the number of data points exceed (or meet) a threshold number of data points. In an example, if it is determined that the number of data points do not exceed (or do not meet) the threshold number of data points, the method 600 may be repeated. However, if it is determined that the number of stored data points exceed (or meet) the threshold number of data points, the controller and/or the firmware may execute the method 700 shown and described with respect to FIG. 7.

Referring back to operation 630, if it is determined (630) that the number of received I/O commands is not equal to (or does not exceed) the received I/O command threshold, the controller and/or the firmware may determine (660) a number of data points that have been stored. A determination is then made as to whether (670) the number of data points exceed (or meet) a threshold number of data points such as previously described. In an example, if it is determined that the number of data points do not exceed (or do not meet) the threshold number of data points, the method 600 may be repeated. However, if it is determined that the number of stored data points exceed (or meet) the threshold number of data points, the controller and/or the firmware may execute the method 700 shown and described with respect to FIG. 7.

Figure 7:
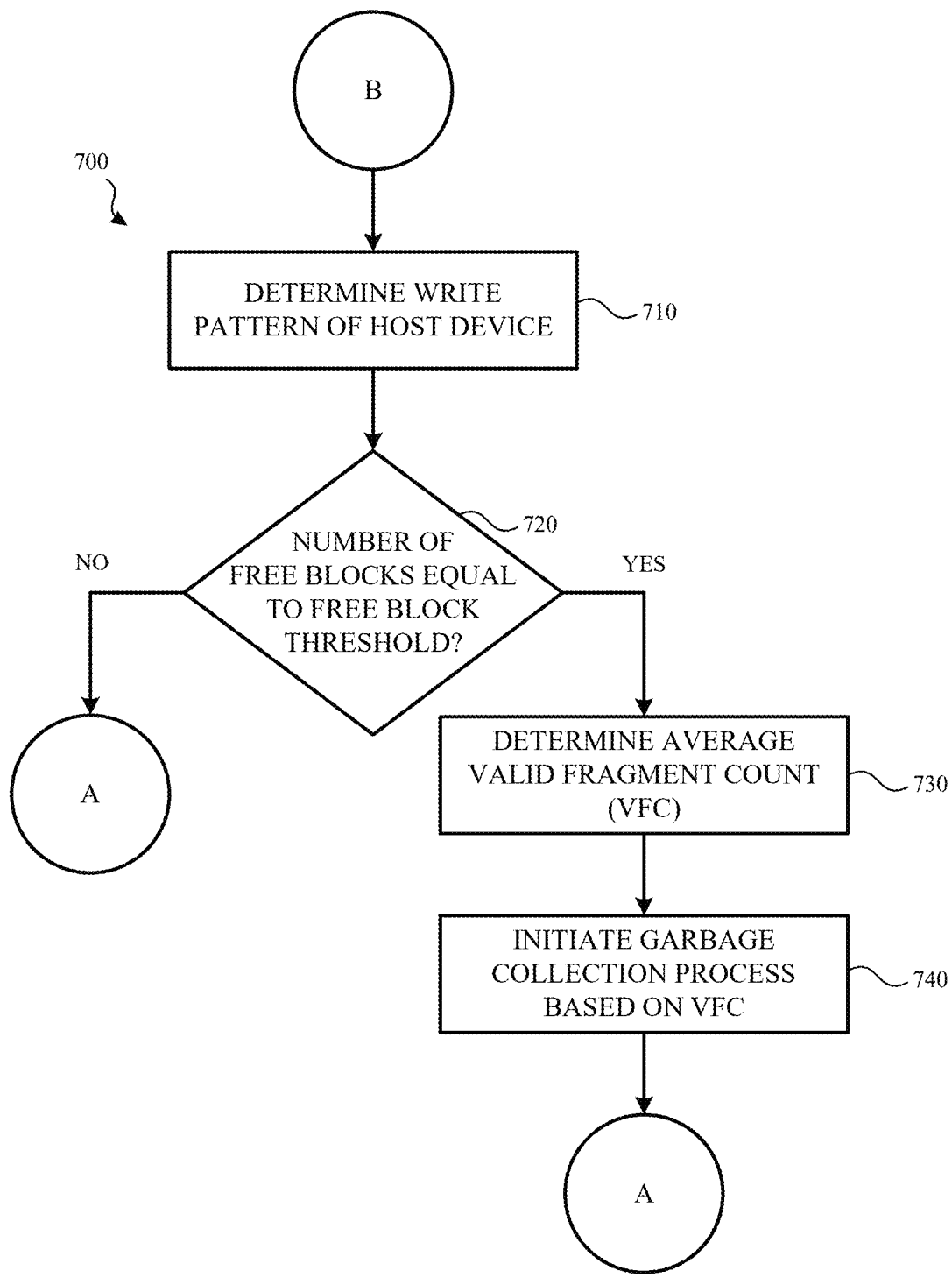
FIG. 7 illustrates a method for determining whether to initiate a garbage collection operation based, at least in part, on a determined write pattern of a host device according to an example.

FIG. 7 illustrates a method 700 for determining whether to initiate a garbage collection operation based, at least in part, on a determined write pattern of a host device according to an example. In an example, the method 700 may be performed by a controller and/or firmware of a data storage device, such as, for example, the controller 150 and/or the firmware 160 of the data storage device 110 shown and described with respect to FIG. 1. Additionally, the method 700 may be used in conjunction with the method 600 shown and described with respect to FIG. 6.

In an example, when it is determined (670) that the number of data points exceed (or meet) the threshold number of data points, the controller and/or the firmware determine (710) a write pattern of the host device. In an example, the write pattern of the host device is based, at least in part, on the various data points that have been stored.

When the write pattern of the host device is determined, the controller and/or the firmware may also determine (720) whether a number of free blocks in the data storage device will be equal to (or fall below) a free memory block threshold. In an example, the determination (720) is based, at least in part, on the determined write pattern of the host device and on a number of future I/O commands that will be received by the host device and/or executed by the controller.

For example using the various data points, the controller and/or the firmware may predict or determine the number of memory blocks that will be used in upcoming or future I/O commands that will be received from the host device. In an example, the upcoming I/O commands may be the next n I/O commands received from the host device. In another example, the upcoming or future I/O commands may be the next n*m I/O commands (where m indicates a number of times that n I/O commands are received). In another example, the controller and/or the firmware may predict or determine the number of memory blocks that will be available after the next n*m I/O commands are received and/or resolved.

As previously described, the controller and/or the firmware may determine the write pattern of the host device using a linear regression model. For example, a linear regression line corresponding to the various data points may be determined and used to calculate or otherwise determine if and/or when a number of free blocks in the data storage device will reach or fall below a free block threshold. For example, the data points and/or the regression line may be used to determine whether the amount of free memory blocks will fall below a free memory block threshold after n*m I/O commands are received and/or resolved.

For example, if the variable m is 20 and the variable n is 256, the determination that is made will be whether the number of free memory blocks in the data storage device will be at or below the free memory block threshold (e.g., 10 free memory blocks) after a total of 5,120 future I/O commands are received/resolved.

If it is determined (720) that the number of free memory blocks will be at or below the free memory block threshold value after the future I/O commands are received/resolved, the controller and/or the firmware determine (730) an average valid fragment count (VFC) of the data storage device. As discussed, the average VFC may indicate how many valid segments (e.g., pages or metapages) are in each memory block (e.g., a metablock) across the entire data storage device.

The controller and/or the firmware may then initiate (740) a garbage collection process. In an example, the amount of data that is relocated during the garbage collection process is based, at least in part, on the determined average VFC. For example, if the average VFC is above a first threshold, a first amount of data is relocated each time an I/O command is received from the host device and/or resolved. In another example, if the average VFC is above a second threshold but below the first threshold, a second amount of data is relocated each time an I/O command is received and/or resolved. Once the garbage collection process is initiated, the method 600 may be repeated.

Referring back to operation 720, if it is determined that the number of free memory blocks will not be at or below the free memory block threshold value, the method 600 may be repeated.

Figure 8:
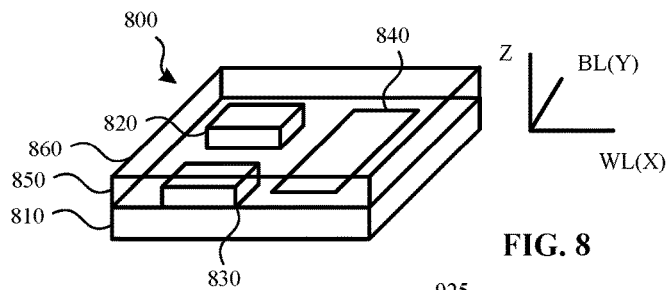
FIG. 8 is a perspective view of a storage device that includes three-dimensional (3D) stacked non-volatile memory according to an example.
Figure 9:
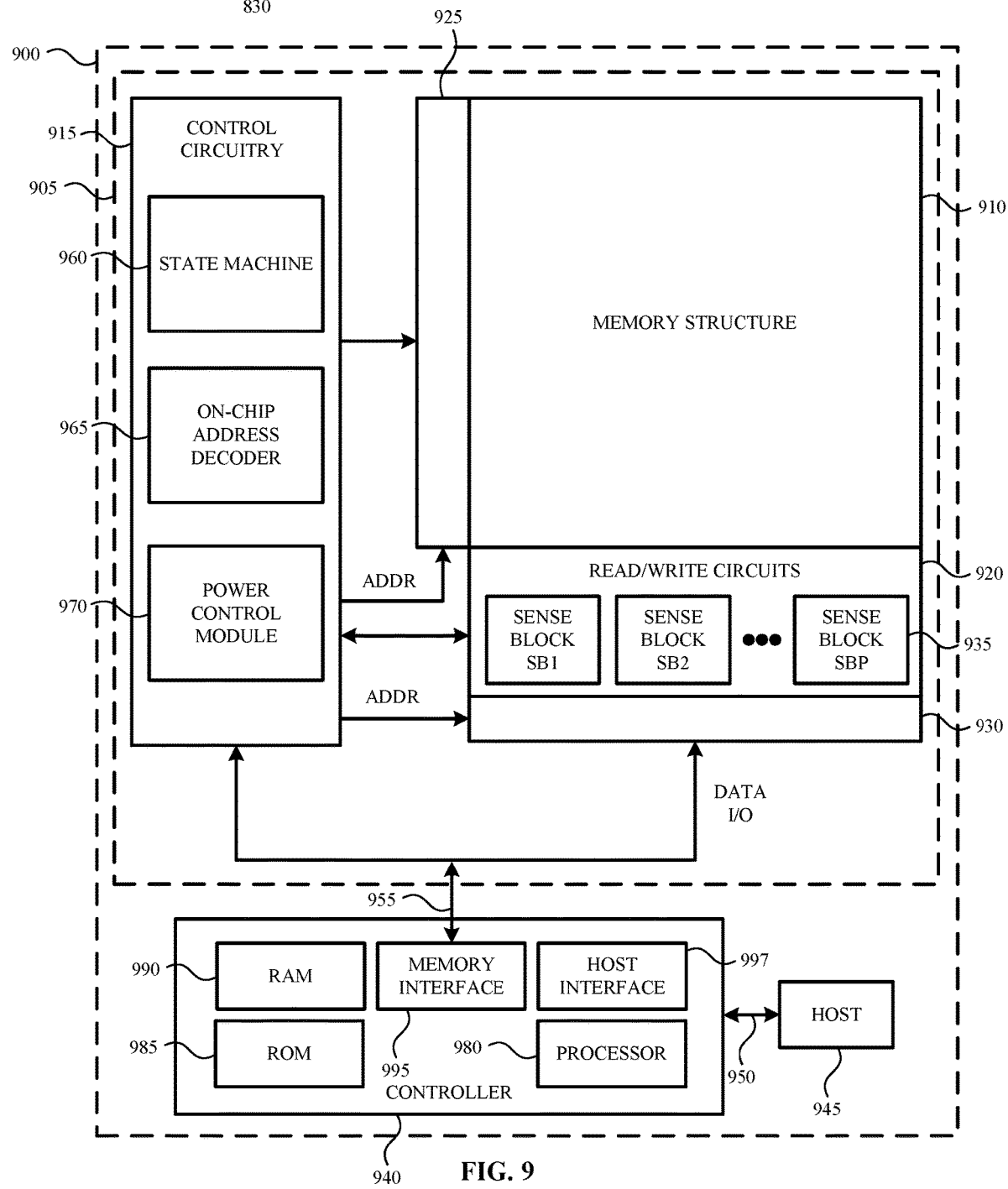
FIG. 9 is a block diagram of a storage device according to an example.

FIG. 8 and FIG. 9 describe example storage devices that may be used with or otherwise implement the various features described herein. For example, the storage devices shown and described with respect to FIG. 8 and FIG. 9 may include various systems and components that are similar to the systems and components shown and described with respect to FIG. 1. For example, a controller 922 shown and described with respect to FIG. 9 may be similar to the controller 150 of FIG. 1. Additionally, a memory die 708 may be included as part of the memory device 155.

FIG. 8 is a perspective view of a storage device 800 that includes three-dimensional (3D) stacked non-volatile memory according to an example. In this example, the storage device 800 includes a substrate 810. Blocks of memory cells are included on or above the substrate 810. The blocks may include a first block (BLK0 820) and a second block (BLK1 830). Each block may be formed of memory cells (e.g., non-volatile memory elements). The substrate 810 may also include a peripheral area 840 having support circuits that are used by the first block and the second block.

The substrate 810 may also carry circuits under the blocks, along with one or more lower metal layers which are patterned in conductive paths to carry signals from the circuits. The blocks may be formed in an intermediate region 850 of the storage device 800. The storage device may also include an upper region 860. The upper region 860 may include one or more upper metal layers that are patterned in conductive paths to carry signals from the circuits. Each block of memory cells may include a stacked area of memory cells. In an example, alternating levels of the stack represent word lines. While two blocks are depicted, additional blocks may be used and extend in the x-direction and/or the y-direction.

In an example, a length of a plane of the substrate 810 in the x-direction represents a direction in which signal paths for word lines or control gate lines extend (e.g., a word line or drain-end select gate (SGD) line direction) and the width of the plane of the substrate 810 in the y-direction represents a direction in which signal paths for bit lines extend (e.g., a bit line direction). The z-direction represents a height of the storage device 800.

FIG. 9 is a block diagram of a storage device 900 according to an example. In an example, the storage device 900 may be the 3D stacked non-volatile storage device 800 shown and described with respect to FIG. 8. The components depicted in FIG. 9 may be electrical circuits. In an example, the storage device 900 includes one or more memory dies 905. Each memory die 905 includes a three-dimensional memory structure 910 of memory cells (e.g., a 3D array of memory cells), control circuitry 915, and read/write circuits 920. In another example, a two-dimensional array of memory cells may be used. The memory structure 910 is addressable by word lines using a first decoder 925 (e.g., a row decoder) and by bit lines using a second decoder 930 (e.g., a column decoder). The read/write circuits 920 may also include multiple sense blocks 935 including SB1, SB2, . . . . SBp (e.g., sensing circuitry) which allow pages of the memory cells to be read or programmed in parallel. The sense blocks 935 may include bit line drivers.

In an example, a controller 940 is included in the same storage device 900 as the one or more memory dies 905. In another example, the controller 940 is formed on a die that is bonded to a memory die 905, in which case each memory die 905 may have its own controller 940. In yet another example, a controller die controls all of the memory dies 905.

Commands and data may be transferred between a host 945 and the controller 940 using a data bus 950. Commands and data may also be transferred between the controller 940 and one or more of the memory dies 905 by way of lines 955. In one example, the memory die 905 includes a set of input and/or output (I/O) pins that connect to lines 955.

The memory structure 910 may also include one or more arrays of memory cells. The memory cells may be arranged in a three-dimensional array or a two-dimensional array. The memory structure 910 may include any type of non-volatile memory that is formed on one or more physical levels of arrays of memory cells having an active area disposed above a silicon substrate. The memory structure 910 may be in a non-volatile memory device having circuitry associated with the operation of the memory cells, whether the associated circuitry is above or within the substrate.

The control circuitry 915 works in conjunction with the read/write circuits 920 to perform memory operations (e.g., erase, program, read, and others) on the memory structure 910. The control circuitry 915 may include registers, ROM fuses, and other devices for storing default values such as base voltages and other parameters.

The control circuitry 915 may also include a state machine 960, an on-chip address decoder 965, and a power control module 970. The state machine 960 may provide chip-level control of various memory operations. The state machine 960 may be programmable by software. In another example, the state machine 960 does not use software and is completely implemented in hardware (e.g., electrical circuits).

The on-chip address decoder 965 may provide an address interface between addresses used by host 945 and/or the controller 940 to a hardware address used by the first decoder 925 and the second decoder 930.

The power control module 970 may control power and voltages that are supplied to the word lines and bit lines during memory operations. The power control module 970 may include drivers for word line layers in a 3D configuration, select transistors (e.g., SGS and SGD transistors) and source lines. The power control module 970 may include one or more charge pumps for creating voltages.

The control circuitry 915, the state machine 960, the on-chip address decoder 965, the first decoder 925, the second decoder 930, the power control module 970, the sense blocks 935, the read/write circuits 920, and/or the controller 940 may be considered one or more control circuits and/or a managing circuit that perform some or all of the operations described herein.

In an example, the controller 940, is an electrical circuit that may be on-chip or off-chip. Additionally, the controller 940 may include one or more processors 980, ROM 985, RAM 990, memory interface 995, and host interface 997, all of which may be interconnected. In an example, the one or more processors 980 is one example of a control circuit. Other examples can use state machines or other custom circuits designed to perform one or more functions. Devices such as ROM 985 and RAM 990 may include code such as a set of instructions. One or more of the processors 980 may be operable to execute the set of instructions to provide some or all of the functionality described herein.

Alternatively or additionally, one or more of the processors 980 may access code from a memory device in the memory structure 910, such as a reserved area of memory cells connected to one or more word lines. The memory interface 995, in communication with ROM 985, RAM 990, and one or more of the processors 980, may be an electrical circuit that provides an electrical interface between the controller 940 and the memory die 905. For example, the memory interface 995 may change the format or timing of signals, provide a buffer, isolate from surges, latch I/O, and so forth.

The one or more processors 980 may issue commands to control circuitry 915, or any other component of memory die 905, using the memory interface 995. The host interface 997, in communication with the ROM 985, the RAM 995, and the one or more processors 980, may be an electrical circuit that provides an electrical interface between the controller 940 and the host 945. For example, the host interface 997 may change the format or timing of signals, provide a buffer, isolate from surges, latch I/O, and so on. Commands and data from the host 945 are received by the controller 940 by way of the host interface 997. Data sent to the host 945 may be transmitted using the data bus 950.

Multiple memory elements in the memory structure 910 may be configured so that they are connected in series or so that each element is individually accessible. By way of a non-limiting example, flash memory devices in a NAND configuration (e.g., NAND flash memory) typically contain memory elements connected in series. A NAND string is an example of a set of series-connected memory cells and select gate transistors.

According to the above, examples of the present disclosure describe a method, comprising: tracking a number of commands received from a host device; determining a number of free memory blocks in a data storage device, based, at least in part, on a predetermined number of commands being received; determining a write pattern of the host device based, at least in part, on the number of commands received from the host device and the number of free memory blocks in the data storage device; and initiating a garbage collection process based, at least in part, on the determined write pattern of the host device. In an example, the method also includes determining whether the determined write pattern of the host device will cause the number of free memory blocks to fall below a free memory block threshold after a predetermined number of additional commands are received. In an example, the method also includes determining an average valid fragment count (VFC) of the data storage device based, at least in part, on determining that the write pattern of the host device will cause the number of free memory blocks to fall below the free memory block threshold. In an example, the method also includes transferring an amount of data from a first memory location in the data storage device to a second memory location in the data storage device during the garbage collection process based, at least in part, on the average VFC. In an example, the method also includes storing the average VFC in the data storage device. In an example, the write pattern of the host device is determined using a linear regression model. In an example, the number of commands received from the host device and the number of free memory blocks in the data storage device are stored as a data point for the linear regression model. In an example, the write pattern of the host device is determined after a threshold number of data points have been stored.

Another example describes a data storage device, comprising: a controller; and one or more memory devices communicatively coupled to the controller and storing instructions that, when executed by the controller, cause the controller to: track a number of commands received from a host device; determine a number of free memory blocks in the data storage device, based, at least in part, on a predetermined number of commands being received; store the number of commands received from the host device and the determined number of free memory blocks as a data point; determine a write pattern of the host device based, at least in part, on a number of data points exceeding a data point threshold; and initiate a garbage collection process based, at least in part, on the determined write pattern of the host device. In an example, memory also stores instructions for causing the controller to determine whether the determined write pattern of the host device will cause the number of free memory blocks to fall below a free memory block threshold after a predetermined number of additional commands are received. In an example, memory also stores instructions for causing the controller to determine an average valid fragment count (VFC) of the data storage device based, at least in part, on determining the write pattern of the host device will cause the number of free memory blocks to fall below the free memory block threshold. In an example, memory also stores instructions for transferring an amount of data from a first memory location in the data storage device to a second memory location in the data storage device during the garbage collection process based, at least in part, on the average VFC. In an example, memory also stores instructions for causing the controller to store the average VFC. In an example, the write pattern of the host device is determined using a linear regression model. In an example, the data points are used to determine a regression line using the linear regression model.

Other examples describe a data storage device, comprising: means for tracking a number of commands received from a host device; means for determining a number of free memory blocks in the data storage device, based, at least in part, on a predetermined number of commands being received; means for determining a write pattern of the host device based, at least in part, on the number of commands received from the host device and the number of free memory blocks in the data storage device; and means for initiating a garbage collection process based, at least in part, on the determined write pattern of the host device. In an example, the data storge device also includes means for determining whether the determined write pattern of the host device will cause the number of free memory blocks to fall below a free memory block threshold after a predetermined number of additional commands are received. In an example, the data storge device also includes means for determining an average valid fragment count (VFC) of the data storage device. In an example, the garbage collection process transfers a first amount of data from a first memory location in the data storage device to a second memory location in the data storage device based, at least in part, on the average VFC having a first value and wherein the garbage collection process transfers a second amount of data from the first memory location in the data storage device to the second memory location in the data storage device based, at least in part, on the average VFC having a second value. In an example, the write pattern of the host device is determined using a linear regression model.

The term computer-readable media as used herein may include computer storage media. Computer storage media may include volatile and nonvolatile, removable and non-removable media implemented in any method or technology for storage of information, such as computer readable instructions, data structures, or program modules. Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by a computing device (e.g., host device 105 (FIG. 1)). Any such computer storage media may be part of the computing device. Computer storage media does not include a carrier wave or other propagated or modulated data signal.

Additionally, examples described herein may be discussed in the general context of computer-executable instructions residing on some form of computer-readable storage medium, such as program modules, executed by one or more computers or other devices. By way of example, and not limitation, computer-readable storage media may comprise non-transitory computer storage media and communication media. Generally, program modules include routines, programs, objects, components, data structures, etc., that perform particular tasks or implement particular abstract data types. The functionality of the program modules may be combined or distributed as desired in various examples.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

The description and illustration of one or more aspects provided in the present disclosure are not intended to limit or restrict the scope of the disclosure in any way. The aspects, examples, and details provided in this disclosure are considered sufficient to convey possession and enable others to make and use the best mode of claimed disclosure.

Aspects of the present disclosure have been described above with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks. Additionally, it is contemplated that the flowcharts and/or aspects of the flowcharts may be combined and/or performed in any order. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

References to an element herein using a designation such as "first," "second," and so forth does not generally limit the quantity or order of those elements. Rather, these designations may be used as a method of distinguishing between two or more elements or instances of an element. Thus, reference to first and second elements does not mean that only two elements may be used or that the first element precedes the second element. Additionally, unless otherwise stated, a set of elements may include one or more elements.

Terminology in the form of "at least one of A, B, or C" or "A, B, C, or any combination thereof" used in the description or the claims means "A or B or C or any combination of these elements." For example, this terminology may include A, or B, or C, or A and B, or A and C, or A and B and C, or 2A, or 2B, or 2C, or 2A and B, and so on. As an additional example, "at least one of: A, B, or C" is intended to cover A, B, C, A-B, A-C, B-C, and A-B-C, as well as multiples of the same members. Likewise, "at least one of: A, B, and C" is intended to cover A, B, C, A-B, A-C, B-C, and A-B-C, as well as multiples of the same members.

Similarly, as used herein, a phrase referring to a list of items linked with "and/or" refers to any combination of the items. As an example, "A and/or B" is intended to cover A alone, B alone, or A and B together. As another example, "A, B and/or C" is intended to cover A alone, B alone, C alone, A and B together, A and C together, B and C together, or A, B, and C together.

What is claimed is:

1. A method, comprising:
   tracking a number of commands received from a host device;
   determining a number of free memory blocks in a data storage device based, at least in part, on a predetermined number of commands being received;
   generating a data point based, at least in part, on the number of received commands and the determined number of free memory blocks;
   determining a write pattern of the host device based, at least in part, on a determination that a plurality of data points have been generated; and
   initiating a garbage collection process based, at least in part, on the determined write pattern of the host device.

2. The method of claim 1, further comprising determining whether the determined write pattern of the host device will cause the number of free memory blocks to fall below a free memory block threshold after a predetermined number of additional commands are received.

3. The method of claim 2, further comprising determining an average valid fragment count (VFC) of the data storage device based, at least in part, on determining that the write pattern of the host device will cause the number of free memory blocks to fall below the free memory block threshold.

4. The method of claim 3, further comprising transferring an amount of data from a first memory location in the data storage device to a second memory location in the data storage device during the garbage collection process based, at least in part, on the average VFC.

5. The method of claim 3, further comprising storing the average VFC in the data storage device.

6. The method of claim 1, wherein the write pattern of the host device is determined using a linear regression model.

7. The method of claim 1, further comprising storing the generated data point.

8. A data storage device, comprising:
   a controller; and
   one or more memory devices communicatively coupled to the controller and storing instructions that, when executed by the controller, cause the controller to:
   track a number of commands received from a host device;
   determine a number of free memory blocks in the data storage device, based, at least in part, on a predetermined number of commands being received;
   store the number of commands received from the host device and the determined number of free memory blocks as a data point;
   determine a write pattern of the host device based, at least in part, on a number of data points exceeding a data point threshold; and
   initiate a garbage collection process based, at least in part, on the determined write pattern of the host device.

9. The data storage device of claim 8, further comprising instructions for causing the controller to determine whether the determined write pattern of the host device will cause the number of free memory blocks to fall below a free memory block threshold after a predetermined number of additional commands are received.

10. The data storage device of claim 9, further comprising instructions for causing the controller to determine an average valid fragment count (VFC) of the data storage device based, at least in part, on determining the write pattern of the host device will cause the number of free memory blocks to fall below the free memory block threshold.

11. The data storage device of claim 10, further comprising instructions for transferring an amount of data from a first memory location in the data storage device to a second memory location in the data storage device during the garbage collection process based, at least in part, on the average VFC.

12. The data storage device of claim 10, further comprising instructions for causing the controller to store the average VFC.

13. The data storage device of claim 8, wherein the write pattern of the host device is determined using a linear regression model.

14. The data storage device of claim 13, wherein the data points are used to determine a regression line using the linear regression model.

15. A data storage device, comprising:
    means for tracking a number of commands received from a host device;
    means for determining a number of free memory blocks in the data storage device, based, at least in part, on a predetermined number of commands being received;
    means for generating a plurality of data points based, at least in part, on the number of commands received from the host device and the number of free memory blocks in the data storage device;

means for determining a write pattern of the host device based, at least in part, on the generated plurality of data points; and means for initiating a garbage collection process based, at least in part, on the determined write pattern of the host device.

16. The data storge device of claim 15, further comprising means for determining whether the determined write pattern of the host device will cause the number of free memory blocks to fall below a free memory block threshold after a predetermined number of additional commands are received.

17. The data storage device of claim 16, further comprising means for determining an average valid fragment count (VFC) of the data storage device.

18. The data storage device of claim 17, wherein the garbage collection process transfers a first amount of data from a first memory location in the data storage device to a second memory location in the data storage device based, at least in part, on the average VFC having a first value and wherein the garbage collection process transfers a second amount of data from the first memory location in the data storage device to the second memory location in the data storage device based, at least in part, on the average VFC having a second value.

19. The data storage device of claim 15, wherein the write pattern of the host device is determined using a linear regression model.

20. The data storage device of claim 19, further comprising means for determining a regression line, the regression line being based, at least in part, on the generated plurality of data points and the linear regression model.

* * * * *